US006888923B2

(12) United States Patent
Dahan et al.

(10) Patent No.: US 6,888,923 B2
(45) Date of Patent: May 3, 2005

(54) ASSEMBLY FOR MOUNTING A RADIATION EMITTING DEVICE, RADIATION EMITTING DEVICE HAVING SUCH AN ASSEMBLY, AND A RADIOLOGICAL APPARATUS HAVING SUCH AN ASSEMBLY AND EMITTING DEVICE

(75) Inventors: Frederic Dahan, Le Chesney (FR); Xavier Lacherade, Versailles (FR); Philippe Blin, Maurepas (FR)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 40 days.

(21) Appl. No.: 10/674,440

(22) Filed: Sep. 30, 2003

(65) Prior Publication Data

US 2004/0086081 A1 May 6, 2004

(30) Foreign Application Priority Data

Oct. 30, 2002 (FR) ............................................ 02 13614

(51) Int. Cl.$^7$ ................................................ H01J 35/10
(52) U.S. Cl. ........................ 378/132; 378/123; 378/144
(58) Field of Search ................................ 378/132, 123, 378/144

(56) References Cited

U.S. PATENT DOCUMENTS

| 4,519,093 A | * | 5/1985 | Kurihara et al. | ............ 378/132 |
| 4,635,283 A | | 1/1987 | Starek et al. | ................ 378/132 |
| 4,679,220 A | * | 7/1987 | Ono | ............................ 378/132 |
| 5,117,448 A | * | 5/1992 | Penato et al. | ................ 378/132 |
| 5,978,448 A | | 11/1999 | Bristol | ........................ 378/123 |
| 6,430,262 B1 | * | 8/2002 | Panasik et al. | .............. 378/132 |

FOREIGN PATENT DOCUMENTS

| DE | 19684919 | 8/1997 |
| EP | 0972490 | 7/1999 |
| FR | 1263049 | 4/1961 |

* cited by examiner

*Primary Examiner*—Craig E. Church
*Assistant Examiner*—Irakli Kiknadze
(74) *Attorney, Agent, or Firm*—Cantor Colburn LLP; Jay L. Chaskin

(57) ABSTRACT

A bearing assembly for the rotational mounting of a rotary anode of an X-ray emitting device on a support having at least one rolling bearing provided in order to be placed between the rotary anode and the support, the rolling bearing having a rotating ring, a non-rotating ring, and rolling elements placed between raceways of the first ring and of the second ring. At least one sleeve is intended to be mounted between an axially stressed ring of the rolling bearing and a cylindrical bearing surface of the anode or of the support, the sleeve being radially elastic in order to compensate for variations in radial dimensions between the ring and the cylindrical bearing surface, and in order to dampen the vibration, while at the same time being suitable for allowing the ring to slide axially with respect to the cylindrical bearing surface.

75 Claims, 3 Drawing Sheets

ASSEMBLY FOR MOUNTING A RADIATION EMITTING DEVICE, RADIATION EMITTING DEVICE HAVING SUCH AN ASSEMBLY, AND A RADIOLOGICAL APPARATUS HAVING SUCH AN ASSEMBLY AND EMITTING DEVICE

CROSS-REFERENCE TO RELATED APPLICATIONS

This application claims the benefit of a priority under 35 USC 1119(a)–(d) to French Patent Application No. 02 13614 filed Oct. 30, 2002, the entire contents of which are hereby incorporated by reference.

BACKGROUND OF THE INVENTION

An embodiment of the invention relates to an assembly for mounting a radiation emitting device and a radiation emitting device having such an assembly. In particular, an embodiment of the invention is directed to a bearing assembly for the rotational mounting of a rotary anode of an X-ray emitting device and array emitting device equipped with such a bearing assembly. The assembly and the device can be used, for example, in a radiological apparatus and in particular, in the field of medical imaging.

A radiological apparatus generally comprises means for emitting radiation, such as a tube for emitting X-ray radiation, and means for directing the radiation, such as a collimator in order to form and define a beam of the X-ray radiation, means for receiving the beam and means for forming an image, such as a radiographic image receiver, and means for positioning supporting an assembly comprising of X-ray tube and the image receiver. The assembly is movable in space about one or more axes. An assembly and radiological apparatus is shown in EP-A-972 490.

An X-ray tube, mounted in a medical radiography apparatus, generally comprises a cathode and an anode, both enclosed in an evacuated sealed envelope, in order to provide electrical insulation between the two electrodes. When a high voltage supply is applied by a generator to the terminals of the cathode and of the anode, a so-called "anode" current is established in the circuit through the generator that produces the high supply voltage. The anode current passes through the space between the cathode and the anode in the form of an electron beam that is received by the anode over a small area forming a focus from which the X-rays are emitted. When the electron beam reaches the anode, the X-rays are emitted by the anode. Only a small percentage of the energy supplied by the electrons is converted into X-rays, the rest of the energy being converted into heat. In order to prevent too great an increase in the temperature of the focus, the focus is formed over an axisymmetric surface of the anode, and the anode is rotated about an axis of rotation. The portion of the axisymmetric surface of the anode forming the focus, located opposite the immovable cathode, continuously moves over the axisymmetric surface of the anode, allowing the heat to be distributed over the whole axisymmetric surface of the anode.

In order to obtain a radiographic image having high resolution, it is desirable to provide a small X-ray source. In other words, the focus must be small. The cathode is designed to obtain an electron beam converging on a small area of the anode forming the focus.

However, when using the X-ray tube, the focus moves with respect to an initial position. This movement is partly due to the high-speed rotation of the anode that is accompanied by vibration, leading to radial movement of the anode and altering the distance between the cathode and the anode.

Moreover, the increase in temperature of the X-ray tube due to the dissipation of heat causes the various constituent elements of the X-ray tube to expand. This expansion may cause a clearance to appear between structural elements of the X-ray tube, which is accompanied by additional vibration of the anode.

The defect in position of the focus causes broadening of the apparent X-ray source, or loss of spatial resolution of the focus, thus decreasing the resolution of a radiographic image that can be obtained. Loss of spatial resolution limits the resolution of a picture obtained from the X-ray source.

BRIEF DESCRIPTION OF THE INVENTION

An embodiment of the invention relates to an assembly for mounting a radiation emitting device and a radiation emitting device having such an assembly. In particular, an embodiment of the invention is directed to a bearing assembly for the rotational mounting of a rotary anode of an X-ray emitting device and array emitting device equipped with such a bearing assembly.

An embodiment of the invention is a bearing assembly for mounting a rotary anode of an X-ray emitting device making it possible to improve the resolution of radiographic images obtained using the X-ray emitting device.

An embodiment of the invention provides a bearing assembly for mounting a rotary anode of an X-ray emitting device capable of compensating for dimensional variations due to the thermal expansion.

An embodiment of the invention provides a bearing assembly for mounting a rotary anode of an X-ray emitting device making it possible to dampen the vibration.

In an embodiment of the invention, a bearing assembly for the rotational mounting of a rotary anode of an X-ray emitting device on a support comprises at least one rolling bearing provided in order to be placed between the rotary anode and the support, the rolling bearing comprising a first ring, a second ring, and rolling elements placed between raceways of the first ring and of the second ring. The assembly further comprises at least one sleeve intended to be mounted between an axially stressed ring of the rolling bearing and a cylindrical bearing surface of the anode or of the support, the sleeve being radially elastic in order to compensate for variations in radial dimensions between the ring and the cylindrical bearing surface, and in order to dampen the vibration, while at the same time being suitable for allowing the ring to slide axially with respect to the cylindrical bearing surface.

An embodiment of the invention relates to an X-ray emitting device intended for a radiology apparatus and a radiology apparatus, comprising a cathode and a rotary anode, the device being capable of forming an electron beam that bombards an axisymmetric surface of the rotary anode, the rotary anode being mounted so that it can rotate on a support by means of a bearing assembly.

BRIEF DESCRIPTION OF THE DRAWINGS

An embodiment of the invention will be better understood from the following detailed description taken by way of non-limiting example and illustrated by the appended drawings, in which.

DETAILED DESCRIPTION OF THE INVENTION

Figure 1:
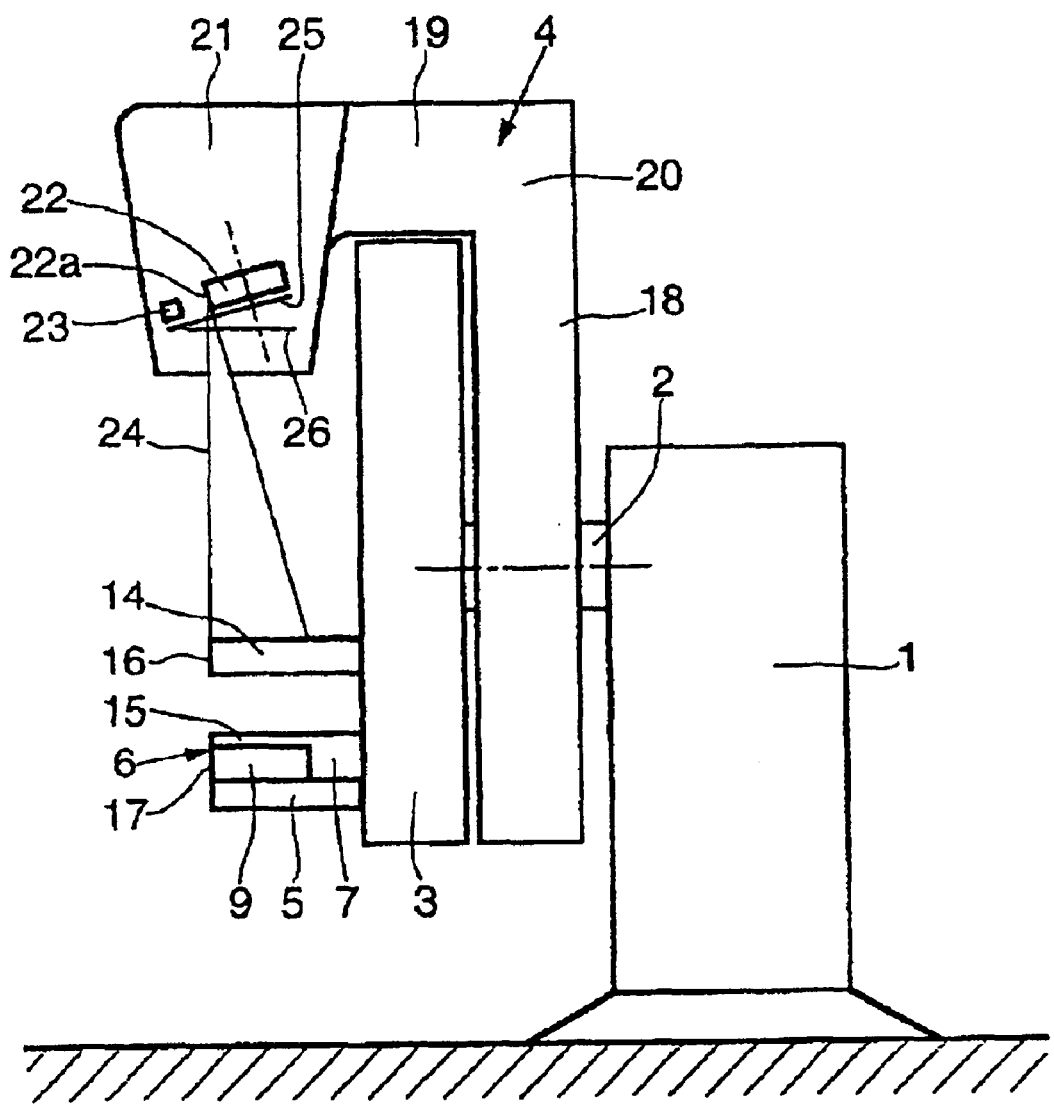
FIG. 1 is an overall schematic view of a radiological apparatus provided with an X-ray tube that may be used in mammography.

In FIG. 1, a radiological apparatus, such as may be used in mammography, comprises a base 1 resting on the ground, supporting, via a horizontal spindle 2, a fixed vertical support column 3, placed at the end of the spindle 2 away from the base 1, and an assembly 4 which can be rotated about the spindle 2. A plate 5 extends horizontally from the column 3, on the side away from the base 1, and acts as support for an assembly 6 that comprises a flat support element 7 extending in a horizontal plane and resting on the plate 5.

A receiver 9 is placed in the plane of the support element 7, horizontally at the end of the support element 7 away from the support column 3. A compression element 14 fastened to the support column 3 and vertically movable with respect to the support column 3, extends horizontally from the support column 3 in a region located vertically opposite a fixed surface 15 of the support 7 located above the receiver 9. The end 16 of the compression element 14 away from the element 7 is located vertically substantially in line with one end 17 of the support element 7 horizontally away from the base 1.

The movable assembly 4 of general L-shape comprises a first arm 18 free to rotate about the spindle 2, and placed axially on the spindle 2 between the support column 3 and the base 1. A second arm 19 extends perpendicularly from one end 20 of the first arm 18, so that the first arm 18 is able to pivot about the spindle 2 without the rotation of the second arm 19 being hampered by the support column 3. At its end away from the end 20, the arm 19 supports an X-ray tube 21 comprising an anode 22 and a cathode 23. The substantially cylindrical anode 22 is placed so that it can rotate about a spindle having a non-zero angle with the vertical. The cathode 23 is placed radially facing a substantially cylindrical axisymmetric surface of the anode. The cathode 23 is located facing the focus 22a of the anode, which is located vertically above the end 17 of the support element 7. A filter 25 and a collimator 26 are placed between the anode/cathode assembly 22, 23 and the receiver 9.

During operation, the X-ray tube 21 produces an X-ray beam 24 which passes through the filter 25, the collimator 26, the compression element 14 and then finally an object, such as an organ, to be investigated (not shown) before reaching the receiver 9. At the output, the receiver 9 emits an image representative of the received photons and dependent on the characteristics of the beam emitted by the emitter, on the filter 25, on the organ to be investigated and on the emitter itself. When investigating, for example, a breast, a patient is positioned at the end 16 of the assembly 6 so as to place a breast between the fixed surface 15 and the compression element 14. The vertical position of the compression element 14 is adjusted so as to press the breast between the compression element 14 and the fixed surface 15. The pressure should be enough to keep the breast immobile when recording the radiographic images. The inclination of the anode 22, and the collimator 26 make it possible to obtain an X-ray beam 24 which does not go beyond the vertical plane perpendicular to the figure and passing through the end 17 of the support 7 on the side away from the column 1, so as to irradiate only the patient's breast, without irradiating the chest.

Figure 2:
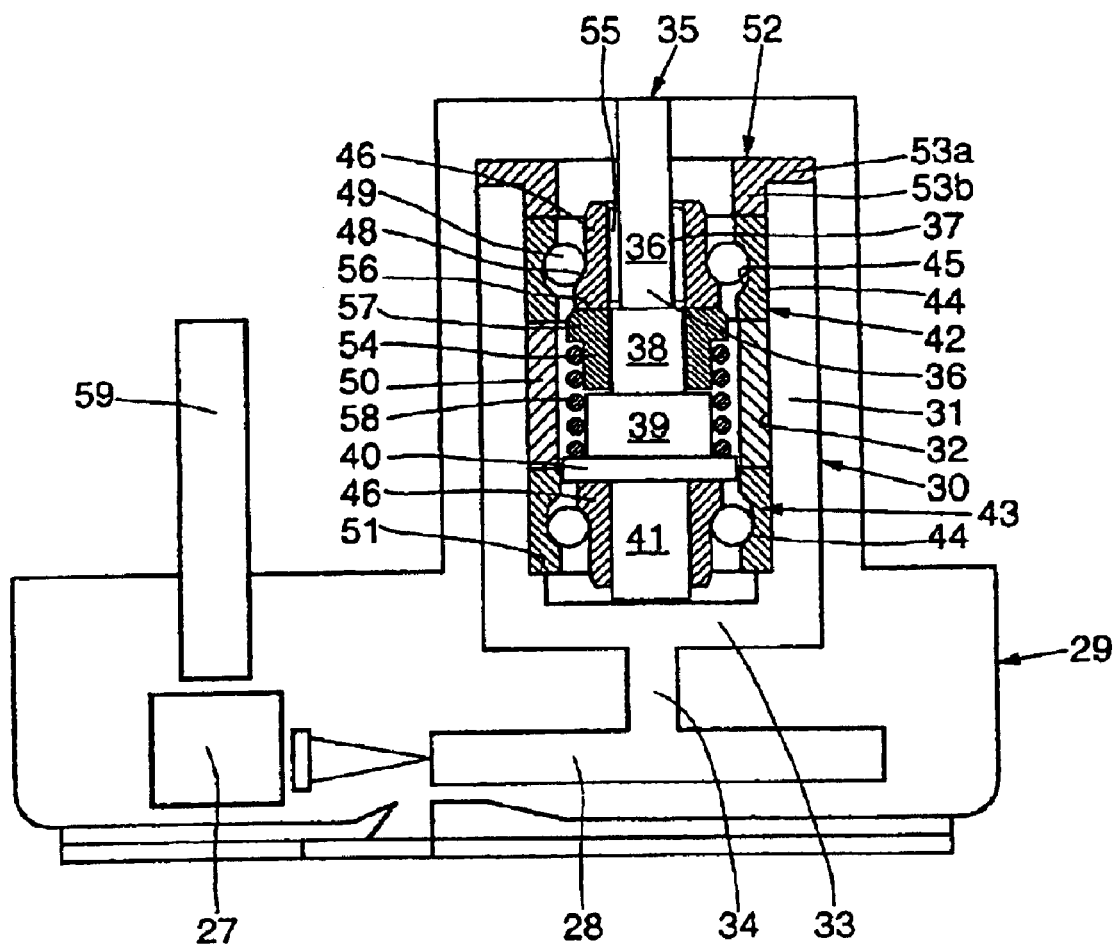
FIG. 2 is a schematic view of an X-ray tube according to one embodiment.

In FIG. 2, an X-ray emitting device comprises a cathode 27 and a cylindrical anode 28 both contained in a sealed envelope 29, making it possible to maintain a partial vacuum.

An anode part 30 comprises a tubular portion 31 having a bore 32, open at one end, and closed at the other end by an end plate 33. A rod 34, coaxial with the tubular portion, extends from the center of the end plate 33, from the side away from the tubular portion 31. The cylindrical anode 28 is coaxial with the tubular portion 31 and secured to the end of the rod 34 away from the end plate 33.

The anode part 30 may be rotated by means of an electric motor (not shown in order to improve the clarity of the drawing.)

The anode part 30 is mounted so that it can rotate on a fixed support shaft 35, one end of which is fastened to a wall of the sealed chamber 29. The support shaft 35 comprises, moving axially along the support shaft 35, a first portion 36, provided with a cylindrical bearing surface 37, and a second portion 38 having a diameter greater than that of the first portion 36, a third portion 39 having an even greater diameter, a fourth portion having an even greater diameter and forming a radial collar 40, and a fifth portion 41. The portions of different diameters are separated by radial shoulders.

The anode part 30 is mounted so that it can rotate on the support shaft 35 by means of two rolling bearings, 42, 43 with oblique contact, each one comprising an external rotating ring 44, provided on an internal surface with a toroidal raceway 45, an internal non-rotating ring 46 having a toroidal raceway 48. Rolling elements 49, in this case in the form of balls, are placed between the raceways 45, 48. The raceway 45 of the external ring 44 has a diameter greater than that of the rolling elements 49. The raceway 48 of the internal ring 46 has a diameter substantially equal to that of the rolling elements 49 while being slightly greater. Thus, an axial force exerted on the internal ring 46 makes it possible, by means of a wedging effect between the rings 44, 46 and the rolling elements 49, possibly with slight relative axial movement of the rings 44, 46, to ensure satisfactory contact between the rolling elements 49 and the raceways 45, 48.

The rolling bearings 42, 43 are fitted in the bore 32 of the tubular portion 31 of the anode part 30 by means of an external ring 44, being kept axially separate by an annular spacer 50. The second rolling bearing 43, located axially on the side of the end plate 33, presses axially on a radial shoulder 51 of the tubular portion 31 formed close to the end plate 33. The first rolling bearing 42 is held axially on the side away from the spacer 50 by a ring 52, having an L-shaped profile in cross section. The ring 52 comprises a radial portion 53a fastened to the radial end face of the tubular portion 31, or example by means of screws, and an axial portion 53b extending from the lesser diameter region of the radial portion 53a, and designed to press by means of its free end on the external ring 44 of the first rolling bearing 42.

The internal ring 46 of the second rolling bearing 43 is fitted over the fifth portion 41 of the support shaft 35 by pressing axially against the collar 40. A pressing ring 54 is fitted over the third portion 39 of the support shaft 35. The internal ring 46 of the second rolling bearing 42 is mounted on the cylindrical bearing surface 37 of the first portion 36 of the support shaft 35 by means of an elastic compensating and damping sleeve 55 which will be described in more detail hereinafter.

The retaining ring 54 is designed to press on the internal ring 46 of the first rolling bearing 42 by means of a radial end face 56. The ring 54 comprises a collar 57 extending radially outwards from the end of the ring 54 on the side of the radial end face 56, in order to form a radial pressing surface on the side away from the said radial face 56. The ring 54 is intended to slide over the second portion 38 of the support shaft 35, and to do this, it will be possible for it to be mounted via a sliding bearing.

A prestressing ring 58 is placed axially between the collar 40 of the support shaft 35 and the collar 57 of the retaining ring 54, while surrounding the ring 54 and the third portion 39 of the support shaft 35. The spring 58 is prestressed during mounting in order to exert an axial force on the internal ring 46 of the first rolling bearing 42 tending to axially separate the internal rings 46 of the respective rolling bearings 42, 43. Thus, the rolling bearings 42, 43 are axially prestressed for improved operation.

The cathode 27 is located radially facing the external axisymmetric surface of the anode 28, which in this case is cylindrical. In operation, the cathode 27 produces an electron beam received by a portion of the axisymmetric surface of the anode 28 located radially facing the cathode 27 called a focus. To obtain a high-energy electron beam, the electrons are accelerated by an intense electric field produced between the cathode 27 and the anode 28 with a potential difference located approximately between 10 and 50 kV, and which can exceed 150 kV in some cases. Supply means 59 make it possible to supply the cathode 27 with energy.

Most of the energy supplied by the electron beam to the focus is converted into heat. Part of the energy is emitted by the focus in the form of X-rays. To prevent the temperature of the surface of the anode 28 increasing, which could damage it, the anode 28 is rotated about the support shaft 35. Thus, the cylindrical surface of the anode 28 rotates in front of the cathode 27. Because of the heat dissipated, the X-ray emitting device sees its temperature increase. Thermal expansion then occurs, which may lead to the appearance of clearances causing vibration.

An elastic sleeve 55 is provided in order to compensate for the variations in radial dimensions, and to absorb the vibration. The elastic sleeve 55 also allows the internal ring 46 of the first rolling bearing 42 to slide axially so that, under the action of the prestressed spring 58, the rolling bearings 42, 43 are axially stressed. The rolling bearings 42, 43 then operate under optimum conditions, the noise decreases and the life of the rolling bearings 42, 43 is increased.

Figure 3:
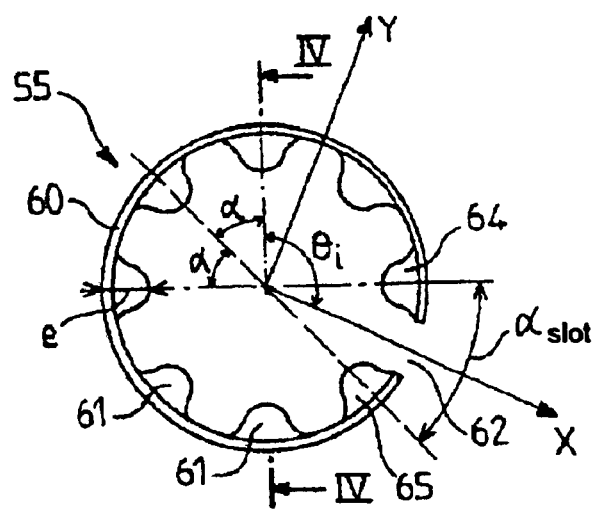
FIG. 3 is a view in radial elevation of a sleeve with internal ribs.
Figure 4:
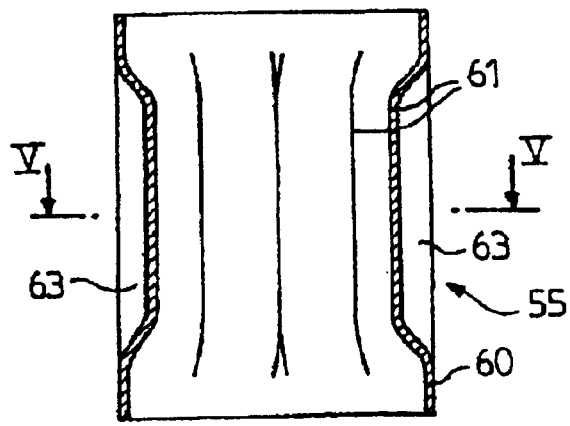
FIG. 4 is a view in axial section along IV—IV of the sleeve according to FIG. 3.
Figure 5:
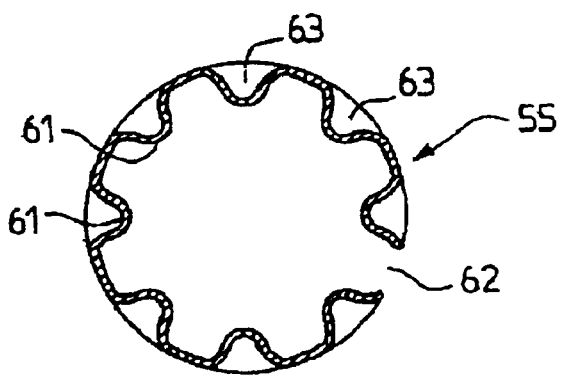
FIG. 5 is a sectional view along V—V of the sleeve according to FIG. 4.

In FIGS. 3 to 5, where the references of FIGS. 1 and 2 have been used for similar elements, a sleeve 55 comprises a thin cylindrical wall 60, provided with longitudinal ribs 61, of which there are eight in this case, which project inwards from the cylindrical wall 60, thereby forming, on the external surface of the cylindrical wall 60, corresponding longitudinal grooves 63 (FIGS. 4, 5). The ribs 61 extend substantially over the entire length of the sleeve 55. However, the axial ends of the sleeve 55 are not deformed. The ribs 61 are terminated at their axial ends by portions of decreasing thickness. The sleeve 55 has an axial slot 62 extending from one end to the other.

The cylindrical wall 60 is in contact, by means of its non-deformed end regions defining a cylindrical envelope, with the internal ring 46 (FIG. 2) of the first rolling bearing 42. The tops of the ribs 61 come into contact with the bearing surface 37 of the portion 36 of the support shaft 35.

The ribs 61 act as radial springs in order to dampen the vibration transmitted between the rotating anode part 30 and the support shaft 35. The ribs 61 also make it possible, by means of the radial elasticity that they give to the sleeve 55, to compensate for different variations in diameter between the support shaft 35 and the internal ring 46, due to thermal expansion on account of the high increase in temperature of the elements of the X-ray tube device when taking radiographic images.

The sleeve 55 also makes it possible, because of the limited areas of contact between the sleeve 55 and the internal ring 46 or the bearing surface 37 of the support shaft 35, to limit friction in order to make axial movement of the internal ring 46 easier. This is because the expansions may also lead to axial expansions, requiring axial movement of the internal ring 46 with respect to the support shaft 35 in order to keep enough prestressing on the rolling bearings 42, 43, so as to ensure that they operate properly and to prevent the appearance of additional vibration.

The sleeve 55 may easily be made from a metal, for example of the steel or copper alloy type. Furthermore, a metal sleeve may easily be covered with a coating promoting sliding. To do this, a coating, for example, of molybdenum disulphide ($MoS_2$) could be provided. In any case, given the considerable mechanical and thermal stresses, a material having mechanical properties which are stable as a function of temperature would preferably be used, within the temperature range reached by the rotary anode of an X-ray emitting device, that is between 0° C. and 500° C.

The ribs 61 are shown as regularly circumferentially spaced. Two successive ribs 61 are radially offset by an angle α. In the embodiment described, the ribs 64, 65, located on each side of the slot 62, are also spaced by an angle $α_{slot}$=α. In other words, the slot 62 and the ribs 61 are adapted so that the slot 62 does not introduce any irregularity into the circumferential distribution of the ribs 61.

In an embodiment, if the ribs 61 are not regularly spaced circumferentially, even with the slot 62, the positioning of the sleeve 55 on a shaft may lead to deformation of the sleeve 55 having the consequence of a coaxiality defect of the sleeve 55 and of the shaft. Such a coaxiality defect could be detrimental. The circumferentially regular distribution of the ribs 61 makes it possible to decrease such a coaxiality defect, as is explained hereinbelow with reference to FIG. 3.

While retaining the references in FIG. 3, consider a sleeve placed in a bore (not shown) of diameter D, and placed on a shaft of diameter d, the sleeve comprising N axial rib [sic] 61 and an axial slot 62. Assume that the N ribs 61 are regularly circumferentially spaced, two adjacent ribs 61 being spaced by a predefined radial distance δ, except for the ribs 64, 65 located on each side of the slot 62. In other words, consider a sleeve in which there is an irregularity in distribution of the ribs on each side of the slot 62. The angular radial distance between two successive ribs is:

$$\alpha = 2\pi \frac{\delta}{\pi D} = \frac{2\delta}{D}$$

The radial distance between the ribs 64, 65 located on each side of the slot 62 is:

$$\alpha_{slot} = 2\pi \frac{\pi D - N\delta}{\pi D} = 2\pi - \frac{2N\delta}{D}$$

Assume that the sleeve in the free state has no coaxiality defect and that the radial elastic behavior of the ribs is linear. It is then possible to determine the coaxiality defect ε, introduced by moving the ribs on introducing a shaft of diameter d, causing radial crushing of the corrugations. We then have:

e, the thickness of the ribs of the sleeve (FIG. 3);

$D_{in}$, the internal diameter of the free ring: $D_{in}$=D−2e;

i, the index number of a corrugation (i∈{1;N});

$λ_i$, the crushing of the $i^{th}$ corrugation;

Let Fi be the standard force resulting from crushing the $i^{th}$ corrugation: Fi=kλ and let $θ_i$ be the angle defined by the top of the $i^{th}$ rib in an axial plane, with the axial plane of symmetry passing through the main axis of the sleeve and the middle of the slot: $θ_i=α_{slot}/2+α(i-1)$ A co-ordinate system is defined in an axial plane, comprising an X-axis (FIG. 3) parallel to the axial plane of symmetry of the sleeve, and a Y-axis (FIG. 3), perpendicular to the X-axis, so as to form an orthogonal co-ordinate system in an axial plane. The equilibrium of the mechanical forces exerted on the shaft on which the sleeve is placed is expressed by the following equations:

$$\sum_{i=1}^{N} F_i \cos\theta_i = 0 \quad \text{equilibrium}/X$$

$$\sum_{i=1}^{N} F_i \sin\theta_i = 0 \quad \text{equilibrium}/Y$$

With a regular circumferential distribution of the ribs around a sleeve with no axial slot, the crushing of the ribs would be identical for all the ribs:

$$\lambda = (D_{in} - d)/2$$

For reasons of simplification and symmetry, it is assumed that: the angular position of the ribs does not significantly change the positioning of the sleeve on the shaft; and the movement in a radial plane of the center of the circle passing through the tops of the ribs takes place along the X-axis.

The crushing of each $i^{th}$ rib can then be deduced therefrom:

$$\lambda_i = (D_{in} - d)/2 + \epsilon \cdot \cos\theta i$$

The set of equations includes a single unknown $\epsilon$. Consequently, the second equation giving the equilibrium of forces on the Y-axis is tautological (0=0). The first equation is equivalent to:

$$\sum_{i=1}^{N} \left( \frac{D_{in} - d}{2} + \varepsilon \cos\theta_i \right) \cos\theta_i = 0$$

that is, an approximation of the coaxiality defect $\epsilon$:

$$\varepsilon = \frac{d - D_{in}}{2} \frac{\sum_{i=1}^{N} \cos\theta_i}{\sum_{i=1}^{N} \cos^2\theta_i}$$

To decrease the coaxiality defect, it is found that the second quotient of the multiplication can simply be cancelled out as soon as $\alpha_{slot} = \alpha$, that is to say as soon as the radial angular spacing between the ribs 61 is circumferentially regular, even in the presence of the slot 62, or in other words, once the radial angular spacing between the longitudinal ribs 64, 65 located on each side of the slot 62 and [sic] equal to the radial angular spacing between two directly adjacent ribs. This gives the rib configuration according to the embodiment illustrated in FIG. 3.

Moreover, a number N of ribs 61 which is a multiple of four can be provided so as to keep the symmetry of the sleeve 55 with respect to the axial planes, thereby better ensuring symmetrical radial deformation of the sleeve 55.

Of course, if required, it would be possible to provide a sleeve having ribs that are not regularly distributed in the circumferential direction, or a number N of ribs that is not a multiple of four.

Figure 6:
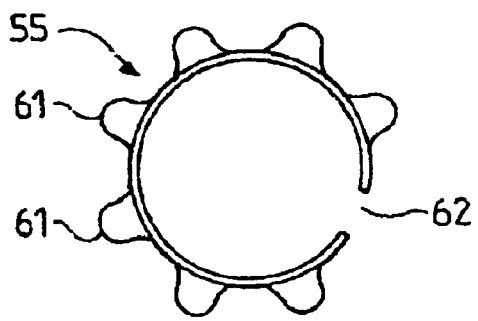
FIG. 6 is a view in radial elevation of a variant of the sleeve according to FIG. 3 with external ribs.

In FIG. 6, in which the references to elements similar to those of FIG. 3 have been used, a sleeve 55 comprises ribs 61, of which there are 7 in this case, projecting radially outwards. In this case, the sleeve 55 is in contact with the portion 36 of the support shaft 35 (FIG. 2) by means of a surface having a cylindrical envelope, and in contact with the internal ring 46 by means of the apexes of the ribs 61.

In the embodiment illustrated in FIG. 6, the ribs are not regularly circumferentially spaced, because of the presence of the slot. Of course, in this scenario, that is to say with ribs projecting outwards, it would also be possible to distribute the ribs regularly, including on each side of the slot 62.

Of course, the sleeve 55 is not limited to the embodiments described above. For example, provision could be made for the sleeve 55 to comprise both ribs projecting inwards and outwards. In this case, provision can be made for a sleeve having a corrugated surface in the circumferential direction, forming ribs on each side of a central cylindrical generatrix.

Moreover, provision could be made for the apexes of the ribs to be slightly flattened, while together still defining a cylindrical envelope, in order to increase the contact area with the ring or the support shaft.

A sleeve placed between an internal ring of a rolling bearing and the support shaft has been described. Of course, the bearing assembly could be adapted without difficulty so that the sleeve is placed between an external ring of a rolling bearing and the tubular portion secured to the anode 28.

Instead of using a single sleeve, as described above, two elastic sleeves could also be superimposed or else an elastic sleeve could be placed inside the internal ring of the bearing and another elastic sleeve outside the external ring of the bearing.

In the embodiments of the invention, a bearing assembly is provided for mounting a rotary anode of an X-ray emitting device making it possible to compensate for differential thermal expansions, in order to prevent the appearance of vibration. The bearing assembly also makes it possible to attenuate the vibration. Decreasing the vibration makes it possible to improve the spatial resolution of the focus of the anode, and, consequently, to improve the resolution of radiographic images obtained using the X-ray emitting device. The time of exposure to the X-rays may be decreased when taking pictures, in order to decrease the exposure of patients.

Furthermore, decreasing vibration makes it possible to increase the life of some components of the bearing assembly and of the X-ray emitting device. Furthermore, the operating noise of the X-ray emitting device is thereby decreased, which increases the comfort of use.

The radially elastic sleeve makes it possible to dampen the vibration that may occur between the rolling bearing and the rotary anode or the support. Attenuating the vibration makes it possible to improve the spatial resolution of the focus. The resolution of an image obtained by means of the emitting device is thus thereby improved. Thus it is possible to obtain shorter exposure times when taking radiographic images. Moreover, decreasing the vibration also makes it possible to decrease the noise produced when taking an image, and to improve comfort in using the X-ray emitting device.

The radial elasticity of the sleeve also makes it possible to compensate for the variations in dimensions due to the thermal expansion of the anode and of the support. The elastic sleeve prevents the appearance of radial clearances that would be the underlying cause of additional vibration.

Since the sleeve is suitable for allowing the ring to slide with respect to the support or the anode, under the axial stressing force exerted on the ring, the latter is axially repositioned in order to prevent the appearance of clearances in the rolling bearing.

The sleeve may, for example, be placed between a non-rotating ring of the rolling bearing and a cylindrical bearing surface formed on the support in order to limit the number of rotating parts.

In one embodiment, the sleeve comprises a thin cylindrical wall having, on one side, circumferentially spaced longitudinal ribs, and corresponding grooves on the opposite side. This particular structure of the sleeve gives it a radial elasticity suitable for damping the vibration and compensating for the variations in diameter. The sleeve has a generally corrugated shape in the circumferential direction, it being possible for each corrugation to act as a radial spring. The sleeve may initially be mounted with radial prestressing. The sleeve may be made of metal.

The ribs may project radially inwards and/or radially outwards. The ribs may be made by deforming the material constituting the cylindrical wall. The ribs are regularly and symmetrically distributed over the sleeve for symmetrical transmission of forces. For this, regularly spaced circumferential ribs can be provided.

To promote the axial sliding of the ring over the sleeve, the sleeve may be provided on an internal and/or external face with a coating in order to improve the sliding.

In one embodiment, the sleeve has a longitudinal slot extending from one end of the sleeve to the other. An open sleeve makes it possible to compensate for large variations in diameter due to significant thermal expansion. During the radial flattening of the sleeve due to the vibration or to its prestressing during mounting, the diameter of the sleeve may vary slightly. The slot makes these perimeter variations easier for better functioning of the sleeve.

If the sleeve is fitted with regularly circumferentially distributed longitudinal ribs, the slot is positioned and adapted so as not to interrupt the regular distribution and the symmetry of the ribs. In particular, the radial distance between two adjacent ribs separated by the slot is preferably equal to the distance between two directly adjacent ribs.

In one embodiment, the assembly comprises, apart from the first rolling bearing, a second rolling bearing provided in order to be placed between the support and the rotary anode, and an axially prestressed elastic element between the first and second rolling bearing in order to exert an axial force separating the rolling bearings. The rolling bearings are in oblique contact in order to withstand the axial prestressing force.

One skilled in the art may propose or make various modifications to the structure and/or steps and/or function and/or way and/or result of the disclosed embodiments and equivalents thereof without departing from the scope and extent of protection.

What is claimed is:

1. An assembly for the rotational mounting of a rotary anode of an X-ray emitting device on a support comprising:
    at least one rolling bearing to be placed between the rotary anode and the support, the rolling bearing comprising a rotating ring, a non-rotating ring, and rolling elements placed between raceways of the first ring and of the second ring; and
    at least one sleeve is mounted between an axially stressed ring of the rolling bearing and a cylindrical bearing surface of the anode or of the support, the sleeve being radially elastic in order to compensate for variations in radial dimensions between the ring and the cylindrical bearing surface, and in order to dampen the vibration, while at the same time being suitable for allowing the ring to slide axially with respect to the cylindrical bearing surface.

2. The assembly according to claim 1 wherein the sleeve comprises a substantially cylindrical wall having, on one side, circumferentially spaced longitudinal ribs, and corresponding grooves on the opposite side.

3. The assembly according to claim 2 wherein the ribs project radially inwards.

4. The assembly according to claim 3 wherein the ribs have been produced by deformation of the cylindrical wall.

5. The assembly according to claim 4 wherein the sleeve comprises a number N of ribs, the number N being a multiple of four.

6. The assembly according to claim 3 wherein the ribs are regularly spaced circumferentially.

7. The assembly according to claim 3 wherein the sleeve comprises a number N of ribs, the number N being a multiple of four.

8. The assembly according to claim 2 wherein the ribs project radially outwards.

9. The assembly according to claim 8 wherein the ribs have been produced by deformation of the cylindrical wall.

10. The assembly according to claim 8 wherein the ribs are regularly spaced circumferentially.

11. The assembly according to claim 8 wherein the sleeve comprises a number N of ribs, the number N being a multiple of four.

12. The assembly according to claim 2 wherein the wall has a corrugated surface forming ribs on each side of a central cylindrical generatrix.

13. The assembly according to claim 12 wherein the ribs have been produced by deformation of the cylindrical wall.

14. The assembly according to claim 12 wherein the ribs are regularly spaced circumferentially.

15. The assembly according to claim 12 wherein the sleeve comprises a number N of ribs, the number N being a multiple of four.

16. The assembly according to claim 2 wherein the ribs have been produced by deformation of the cylindrical wall.

17. The assembly according to claim 16 wherein the ribs are regularly spaced circumferentially.

18. The assembly according to claim 16 wherein the sleeve comprises a number N of ribs, the number N being a multiple of four.

19. The assembly according to claim 2 wherein the ribs are regularly spaced circumferentially.

20. The assembly according to claim 2 wherein the sleeve comprises a number N of ribs, the number N being a multiple of four.

21. The assembly according to claim 1 wherein the sleeve comprises a longitudinal slot extending from one end of the sleeve to the other.

22. The assembly according to claim 1 wherein the sleeve is made of metal.

23. The assembly according to claim 1 wherein the sleeve is provided on an internal and/or external face with a coating in order to improve the sliding of a metal part in contact with the sleeve.

24. The assembly according to claim 1 comprising:
    a first roller bearing;
    a second rolling bearing to be placed between the support and the rotary anode; and
    an axially prestressed elastic element between the first and second rolling bearings in order to exert an axial force separating the rolling bearings.

25. The assembly according to claim 24 wherein the rolling bearings are in oblique contact.

26. The device according to claim 24 wherein the rolling bearings are in oblique contact.

27. X-ray emitting device comprising:
    a cathode;
    a rotary anode;
    the rotary anode being mounted so that it can rotate on a support by means of a bearing assembly;
    the bearing assembly comprising:
        at least one rolling bearing provided to be placed between the rotary anode and the support, the rolling bearing comprising a rotating ring, a non-rotating ring, and rolling elements placed between raceways of the first ring and of the second ring; and
        at least one sleeve is mounted between an axially stressed ring of the rolling bearing and a cylindrical bearing surface of the anode or of the support, the sleeve being radially elastic, while at the same time being suitable for allowing the ring to slide axially with respect to the cylindrical bearing surface.

28. The device according to claim 27 wherein the sleeve comprises a substantially cylindrical wall having, on one side, circumferentially spaced longitudinal ribs, and corresponding grooves on the opposite side.

29. The device according to claim 28 wherein the ribs project radially inwards.

30. The device according to claim 29 wherein the ribs have been produced by deformation of the cylindrical wall of the sleeve.

31. The device according to claim 29 wherein the ribs are regularly spaced circumferentially.

32. The device according to claim 29 wherein the sleeve is made of metal.

33. The device according to claim 29 wherein the sleeve is provided on an internal and/or external face with a coating in order to improve the sliding of a metal part in contact with the sleeve.

34. The device according to claim 29 wherein the sleeve comprises a longitudinal slot extending from one end of the sleeve to the other.

35. The device according to claim 29 comprising:
a first rolling bearing;
a second rolling bearing placed between the support and the rotary anode; and
an axially prestressed elastic element between the first and second rolling bearings.

36. The device according to claim 28 wherein the ribs project radially outwards.

37. The device according to claim 36 wherein the ribs have been produced by deformation of the cylindrical wall of the sleeve.

38. The device according to claim 36 wherein the ribs are regularly spaced circumferentially.

39. The device according to claim 36 wherein the sleeve is made of metal.

40. The device according to claim 36 wherein the sleeve is provided on an internal and/or external face with a coating in order to improve the sliding of a metal part in contact with the sleeve.

41. The device according to claim 36 wherein the sleeve comprises a longitudinal slot extending from one end of the sleeve to the other.

42. The device according to claim 36 comprising:
a first rolling bearing;
a second rolling bearing placed between the support and the rotary anode; and
an axially prestressed elastic element between the first and second rolling bearings.

43. The device according to claim 28 wherein the wall of the sleeve has a corrugated surface forming ribs on each side of a central cylindrical generatrix.

44. The device according to claim 43 wherein the ribs have been produced by deformation of the cylindrical wall of the sleeve.

45. The device according to claim 43 wherein the ribs are regularly spaced circumferentially.

46. The device according to claim 43 wherein the sleeve is made of metal.

47. The device according to claim 43 wherein the sleeve is provided on an internal and/or external face with a coating in order to improve the sliding of a metal part in contact with the sleeve.

48. The device according to claim 43 wherein the sleeve comprises a longitudinal slot extending from one end of the sleeve to the other.

49. The device according to claim 43 comprising:
a first rolling bearing;
a second rolling bearing placed between the support and the rotary anode; and
an axially prestressed elastic element between the first and second rolling bearings.

50. The device according to claim 28 wherein the ribs have been produced by deformation of the cylindrical wall of the sleeve.

51. The device according to claim 50 wherein the ribs are regularly spaced circumferentially.

52. The device according to claim 50 wherein the sleeve is made of metal.

53. The device according to claim 50 wherein the sleeve is provided on an internal and/or external face with a coating in order to improve the sliding of a metal part in contact with the sleeve.

54. The device according to claim 50 wherein the sleeve comprises a longitudinal slot extending from one end of the sleeve to the other.

55. The device according to claim 50 comprising:
a first rolling bearing;
a second rolling bearing placed between the support and the rotary anode; and
an axially prestressed elastic element between the first and second rolling bearings.

56. The device according to claim 28 wherein the ribs are regularly spaced circumferentially.

57. The device according to claim 56 wherein the sleeve is made of metal.

58. The device according to claim 56 wherein the sleeve is provided on an internal and/or external face with a coating in order to improve the sliding of a metal part in contact with the sleeve.

59. The device according to claim 56 wherein the sleeve comprises a longitudinal slot extending from one end of the sleeve to the other.

60. The device according to claim 56 comprising:
a first rolling bearing;
a second rolling bearing placed between the support and the rotary anode; and
an axially prestressed elastic element between the first and second rolling bearings.

61. The device according to claim 28 wherein the sleeve is made of metal.

62. The device according to claim 28 wherein the sleeve is provided on an internal and/or external face with a coating in order to improve the sliding of a metal part in contact with the sleeve.

63. The device according to claim 28 wherein the sleeve comprises a longitudinal slot extending from one end of the sleeve to the other.

64. The device according to claim 28 comprising:
a first rolling bearing;
a second rolling bearing placed between the support and the rotary anode; and
an axially prestressed elastic element between the first and second rolling bearings.

65. The device according to claim 27 wherein the sleeve is made of metal.

66. The device according to claim 65 wherein the sleeve is provided on an internal and/or external face with a coating in order to improve the sliding of a metal part in contact with the sleeve.

67. The device according to claim 65 wherein the sleeve comprises a longitudinal slot extending from one end of the sleeve to the other.

68. The device according to claim 65 comprising:
a first rolling bearing;
a second rolling bearing placed between the support and the rotary anode; and
an axially prestressed elastic element between the first and second rolling bearings.

69. The device according to claim 27 wherein the sleeve is provided on an internal and/or external face with a coating in order to improve the sliding of a metal part in contact with the sleeve.

70. The device according to claim 69 wherein the sleeve comprises a longitudinal slot extending from one end of the sleeve to the other.

71. The device according to claim 69 comprising:
a first rolling bearing;
a second rolling bearing placed between the support and the rotary anode; and
an axially prestressed elastic element between the first and second rolling bearings.

72. The device according to claim 27 comprising:
a first rolling bearing;
a second rolling bearing placed between the support and the rotary anode; and
an axially prestressed elastic element between the first and second rolling bearings.

73. The device according to claim 27 wherein the sleeve comprises a longitudinal slot extending from one end of the sleeve to the other.

74. The device according to claim 73 comprising:
a first rolling bearing;
a second rolling bearing placed between the support and the rotary anode; and
an axially prestressed elastic element between the first and second rolling bearings.

75. A radiological apparatus comprising:
means for emitting radiation;
means for receiving the emitted radiation;
the means for emitting radiation comprising:
   a cathode;
   a rotary anode;
   the rotary anode being mounted so that it can rotate on a support by means of a bearing assembly;
   the bearing assembly comprising:
      at least one rolling bearing to be placed between the rotary anode and the support, the rolling bearing comprising a rotating ring, a non-rotating ring, and rolling elements placed between raceways of the first ring and of the second ring; and
      at least one sleeve is mounted between an axially stressed ring of the rolling bearing and a cylindrical bearing surface of the anode or of the support, the sleeve being radially elastic, while at the same time being suitable for allowing the ring to slide axially with respect to the cylindrical bearing surface.

* * * * *